(12) United States Patent
Matsumoto

(10) Patent No.: US 12,684,073 B2
(45) Date of Patent: Jul. 14, 2026

(54) INSPECTION APPARATUS FOR INSPECTING IMAGE ON SHEET AND IMAGE FORMING SYSTEM THAT INSPECTS PRINTED IMAGE ON SHEET

(71) Applicant: CANON KABUSHIKI KAISHA, Tokyo (JP)

(72) Inventor: Hiroshi Matsumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/637,215

(22) Filed: Apr. 16, 2024

(65) Prior Publication Data

US 2024/0357042 A1 Oct. 24, 2024

(30) Foreign Application Priority Data

Apr. 19, 2023 (JP) ................................. 2023-068890

(51) Int. Cl.
*H04N 1/00* (2006.01)

(52) U.S. Cl.
CPC ..... *H04N 1/00013* (2013.01); *H04N 1/00015* (2013.01); *H04N 1/00602* (2013.01); *H04N 1/0062* (2013.01); *H04N 1/00652* (2013.01)

(58) Field of Classification Search
None
See application file for complete search history.

(56) References Cited

U.S. PATENT DOCUMENTS

| | | | | |
|---|---|---|---|---|
| 5,424,821 A | * | 6/1995 | Sampath | ............ G03G 15/6594 |
| | | | | 250/559.19 |
| 2009/0237745 A1 | * | 9/2009 | Hasegawa | .......... H04N 1/00925 |
| | | | | 358/461 |

FOREIGN PATENT DOCUMENTS

| | | |
|---|---|---|
| JP | 2018074516 A | 5/2018 |
| JP | 2018111582 A | 7/2018 |
| JP | 2021100196 A | 7/2021 |
| JP | 2021192077 A | 12/2021 |

* cited by examiner

*Primary Examiner* — Thomas D Lee
(74) *Attorney, Agent, or Firm* — Canon U.S.A., Inc. IP Division

(57) ABSTRACT

An inspection apparatus includes a tray, a conveyance member configured to convey a sheet from the tray, a reading sensor configured to read an image on the sheet during a passage of the sheet at a reading position, an inspection unit configured to inspect the image read by the reading sensor, and a controller configured to control, in inspection processing, conveyance of the plurality of sheets to cause each of the plurality of sheets to reach the reading position at a predetermined time interval, and set, in a case where the reading sensor reads a reference member during the inspection processing, a time interval from when a first sheet included in the plurality of sheets reaches the reading position to when a second sheet, immediately subsequent to the first sheet, included in the plurality of sheets reaches the reading position to be longer than the predetermined time interval.

20 Claims, 11 Drawing Sheets

FIG.1

CONVEYANCE
DIRECTION

CONVEYANCE
DIRECTION

SHEET PASSING
DIRECTION

INSPECTION APPARATUS FOR INSPECTING IMAGE ON SHEET AND IMAGE FORMING SYSTEM THAT INSPECTS PRINTED IMAGE ON SHEET

BACKGROUND

Field of the Invention

The present invention relates to an inspection apparatus for inspecting an image on a sheet and an image forming system that inspects a printed image on a sheet.

Description of the Related Art

A technique discussed in United States Patent Application Publication No. 2021/0382421 has been known to have a configuration in which a white reference plate is read during a job for reading of images on a plurality of sheets and shading correction coefficients are calculated based on a result of the reading of the white reference plate. This configuration prevents a reduction in reading accuracy of the images on the sheets due to temperature changes. In the technique discussed in United States Patent Application Publication No. 2021/0382421, reading images on sheets conveyed during the white reference plate reading period is skipped. As a result, a reduction in the productivity of an image forming system is prevented.

Japanese Patent Application Laid-Open No. 2018-111582 discusses an inspection system that inspects an image on a sheet.

SUMMARY

According to another aspect of the present invention, an inspection apparatus includes a tray configured to stack sheets, a conveyance member configured to convey a sheet from the tray, a reading sensor including a plurality of pixels and configured to read an image on the sheet during a passage of the sheet conveyed by the conveyance member at a reading position, a reference member configured to be read by the reading sensor, a reading result of the reference member by the reading sensor being used for shading correction to correct output of the plurality of pixels, an inspection unit configured to inspect the image on the sheet read by the reading sensor, and a controller configured to control, in inspection processing where the reading sensor sequentially reads a plurality of sheets and the inspection unit inspects an image on each of the plurality of sheets, conveyance of the plurality of sheets to cause each of the plurality of sheets to reach the reading position at a predetermined time interval, and set, in a case where the reading sensor reads the reference member during the inspection processing, a time interval from when a first sheet included in the plurality of sheets reaches the reading position to when a second sheet, immediately subsequent to the first sheet, included in the plurality of sheets reaches the reading position to be longer than the predetermined time interval, wherein the reading sensor reads the reference member during a period from when the reading sensor reads an image on the first sheet to when the reading sensor reads an image on the second sheet.

Further features of the present invention will become apparent from the following description of exemplary embodiments with reference to the attached drawings.

BRIEF DESCRIPTION OF THE DRAWINGS

FIG. 1 is a sectional view illustrating an image forming system.

DESCRIPTION OF THE EMBODIMENTS

Figure 2:
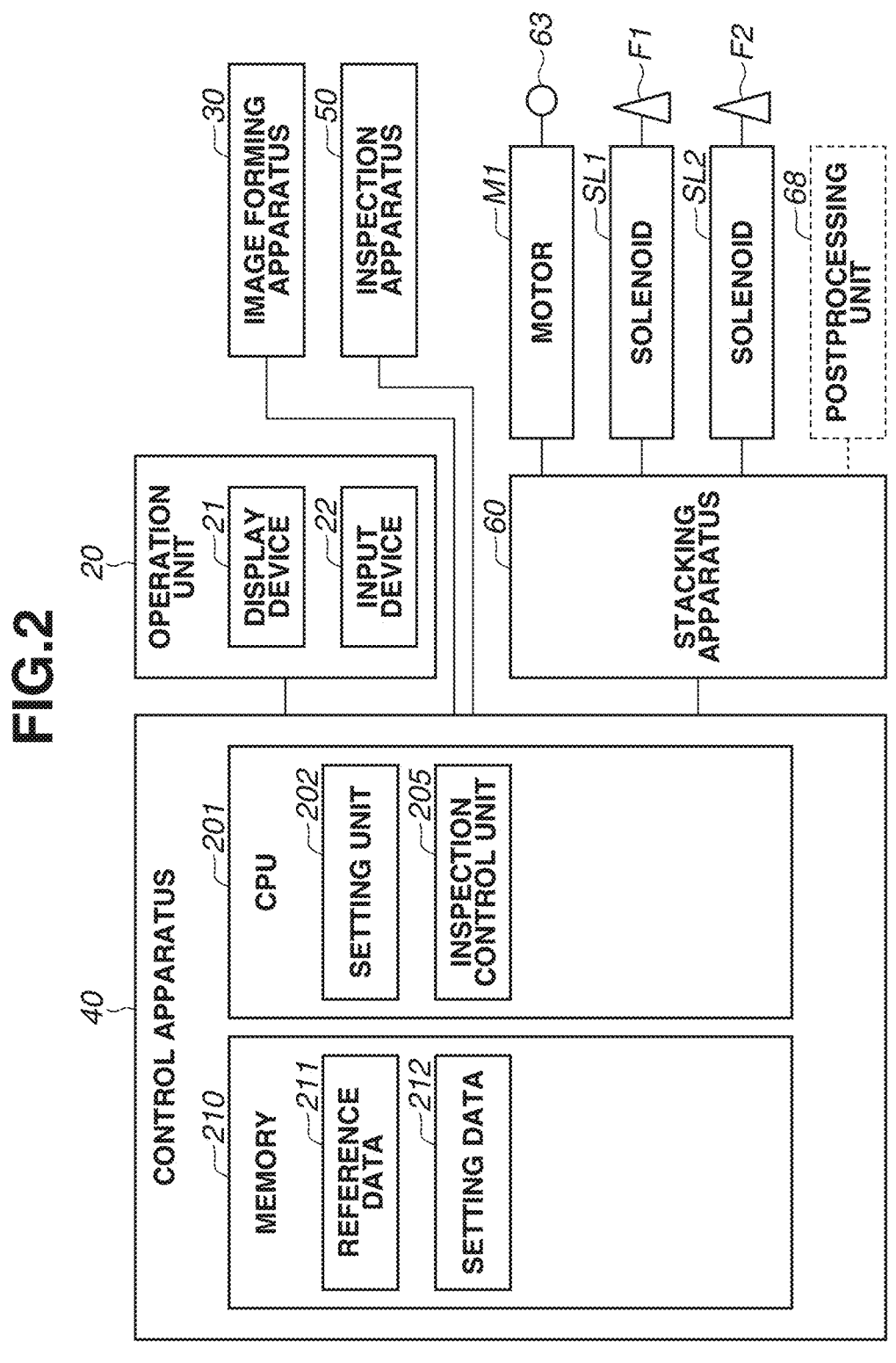
FIG. 2 is a control block diagram illustrating the image forming system.

Hereinafter, exemplary embodiments of the present disclosure will be described with reference to the drawings. However, the shapes of components described in the exemplary embodiments and the relative arrangements thereof should be appropriately changed according to a configuration of an apparatus to which the present disclosure is applied and various conditions, and the scope of the present disclosure is not limited to the following exemplary embodiments.

[Image Forming System]

Figure 1:
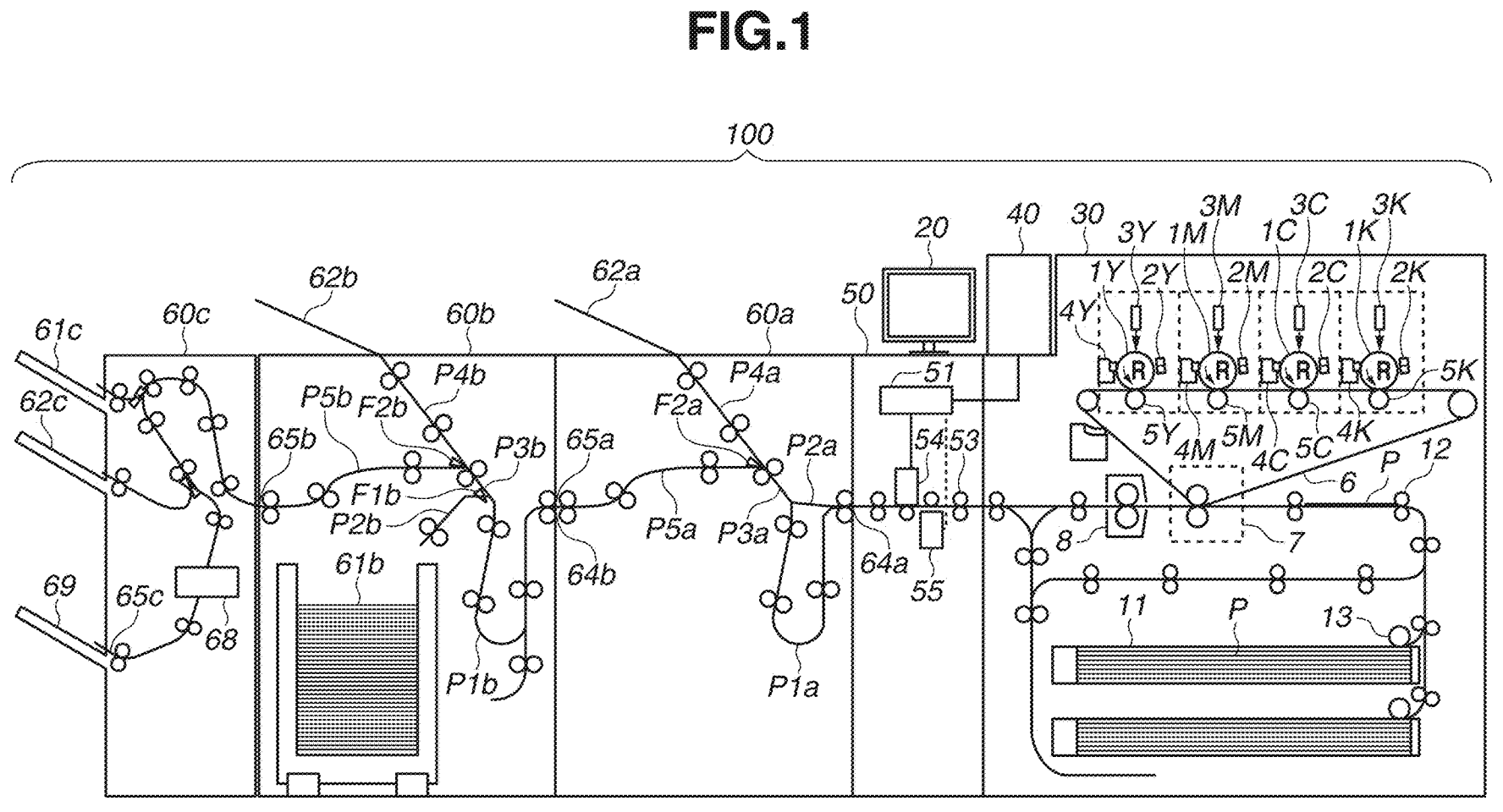

FIG. 1 is a sectional view of an image forming system 100. The image forming system 100 includes an operation unit 20, an electrophotographic color copying machine (hereinafter, referred to as an image forming apparatus) 30, a control apparatus 40, an inspection apparatus 50 serving as a reading apparatus, and stacking apparatuses 60a, 60b, and 60c. The image forming apparatus 30, the inspection apparatus 50, and the stacking apparatuses 60a, 60b, and 60c each have its own casing. The number of stacking apparatuses 60 may be one or more.

The recording method of the image forming apparatus 30 is not limited to the electrophotographic recording and may be inkjet recording, for example. The image forming apparatus 30 may be a monochrome or color image forming apparatus.

A configuration and functions of the image forming system 100 will now be described with reference to FIG. 1.

<Image Forming Apparatus>

The image forming apparatus 30 includes sheet storage trays 11 serving as stacking units for storing sheets P. The sheets P refer to ones on which images are formed by the image forming apparatus 30. Examples of the sheets P include a sheet of paper, a resin sheet, a piece of cloth, an overhead projector (OHP) sheet, and a label.

A sheet P stored in the sheet storage trays 11 is fed out by pickup rollers 13 serving as a feeding unit, and conveyed by conveyance rollers 12.

Image signals input to the image forming apparatus 30 are input, by color component basis, to optical scanning devices which are optical scanning devices 3Y, 3M, 3C, and 3K each including a semiconductor laser and a polygonal mirror. Specifically, a yellow image signal is input to the optical scanning device 3Y. A magenta image signal is input to the optical scanning device 3M. A cyan image signal is input to the optical scanning device 3C. A black image signal is input to the optical scanning device 3K. In the following description, a configuration for forming a yellow image will be described. Magenta, cyan, and black images are formed by similar configurations.

An outer peripheral surface of a photosensitive drum 1Y is charged by a charging device 2Y. After the outer peripheral surface of the photosensitive drum 1Y is charged, the optical scanning device 3Y irradiates the outer peripheral surface of the photosensitive drum 1Y with laser light based on the input image signal via an optical system including the polygonal mirror and a mirror. As a result of the irradiation, an electrostatic latent image is formed on the outer peripheral surface of the photosensitive drum 1Y.

The electrostatic latent image is then developed with toner from a developing device 4Y serving as a developing unit, whereby a toner image is formed on the outer peripheral surface of the photosensitive drum 1Y. The toner image formed on the photosensitive drum 1Y is transferred to a transfer belt 6 serving as an intermediate transfer member by a transfer roller 5Y at a position facing the photosensitive drum 1Y.

Yellow, magenta, cyan, and black toner images transferred to the transfer belt 6 are transferred to the sheet P by a secondary transfer unit 7.

The sheet P to which the toner images are transferred as described above is delivered to a fixing device 8. The fixing device 8 heats and presses the sheet, whereby the toner images are fixed to the sheet P. In the above-described operation, the image forming apparatus 30 forms an image on the sheet P.

<Inspection Apparatus>

The inspection apparatus 50 is an apparatus that reads the image on the sheet P conveyed from the image forming apparatus 30 and inspects a quality of the image. In other words, the inspection apparatus 50 is an apparatus for inspecting whether the image on the sheet P satisfies an inspection criterion.

The image on the sheet P conveyed by a conveyance roller 53 is read by reading units 54 and 55 at respective reading positions. The reading units 54 and 55 each include a light source for illuminating the sheet P and a complementary metal-oxide-semiconductor (CMOS) sensor. The image-read sheet P is discharged to the stacking apparatus 60a.

The stacking apparatus 60a receives the sheet P discharged from the inspection apparatus 50 through an inlet 64a, and discharges the sheet P to a sheet tray 62a or through an outlet 65a.

A branch point between a conveyance path P1a and a conveyance path P2a is disposed at a position downstream of the inlet 64a. A flapper (not-illustrated) is disposed at the branch point and guides the sheet P to either of the conveyance paths P1a and P2a. The conveyance paths P1a and P2a both lead to a conveyance path P3a.

The conveyance path P3a branches into a conveyance path P4a and a conveyance path P5a at a branch position where a flapper F2a is disposed. The sheet P conveyed through the conveyance path P3a is guided to the conveyance path P4a or the conveyance path P5a by the flapper F2a.

A sheet tray 62a is disposed at the outlet of the conveyance path P4a. Sheets having image quality determined as defective (not satisfying the inspection criterion; may be referred to as failed) by the inspection apparatus 50 are stacked on the sheet tray 62a. The sheets having the image quality determined as defective may be discharged to a subsequent apparatus through the outlet 65a. Alternatively, sheets P determined as OK (satisfying the inspection criterion; may be referred to as successful) may be stacked (discharged) on the sheet tray 62a. The conveyance path P5a extends to the outlet 65a.

The stacking apparatus 60b receives the sheet discharged from the stacking apparatus 60a through an inlet 64b, and stacks (discharges) the sheet P on a sheet tray 61b or a sheet tray 62b or discharges the sheet P through an outlet 65b.

A conveyance path P1b extending from the inlet 64b branches into a conveyance path P2b and a conveyance path P3b at a branch position where a flapper F1b is disposed. The sheet P conveyed through the conveyance path P1b is guided to the conveyance path P2b or the conveyance path P3b by the flapper F1b.

A sheet tray 61b is disposed at the outlet of the conveyance path P2b. The sheet tray 61b is a large-volume sheet stacking unit capable of stacking a large number of sheets P. For example, sheets passed the image inspection (quality inspection) are stacked on the sheet tray 61b.

The conveyance path P3b branches into a conveyance path P4b and a conveyance path P5b at a branch position where a flapper F2b is disposed. The sheet P conveyed through the conveyance path P3b is guided to the conveyance path P4b or the conveyance path P5b by the flapper F2b.

A sheet tray 62b is disposed at the outlet of the conveyance path P4b. For example, sheets P having the image quality determined as defective by the inspection apparatus 50 are stacked on the sheet tray 62b. The sheets P having the image quality determined as defective may be discharged to a subsequent apparatus through the outlet 65b. Alternatively, sheets P determined as OK may be stacked on the sheet tray 62b. The conveyance path P5b extends to the outlet 65b.

A subsequent apparatus may be connected to the outlet 65b. A sheet tray 69 may be disposed at an outlet 65c like the stacking apparatus 60c. Similar to the above-described sheet tray, the sheet tray 69 can also stack sheets P having the image quality determined as defective or sheets P having the image quality determined as successful. As described above, the types of sheets P to be discharged to respective sheet trays, which are the sheet trays 61b, 62a, 62b, and 69 and sheet trays 61c and 62c, are determined based on user's settings set in advance.

The sheet trays 61c, 62c, and 69 on the stacking apparatus 60c may be referred to as an upper tray, a middle tray, and a lower tray, respectively. A postprocessing unit 68 may include a binding processor that bundles sheets P discharged from the stacking apparatus 60b into a sheet bundle and staples the sheet bundle. The postprocessing unit 68 may include a bookbinding processor that folds the sheet bundle in two. The postprocessing unit 68 may include a cutting processor that cuts the sheet bundle.

The conveyance paths P1, P2, P3, P4, and P5 in each apparatus individually include one or more conveyance rollers 63. The conveyance rollers 63 convey a sheet P from upstream to downstream in a conveyance direction of the sheet P. The conveyance rollers 63 may be roller pairs each including two rollers for holding and conveying the sheet P.

The number of stacking apparatuses 60 connected downstream of the inspection apparatus 50 can be one or more. The total number of sheet trays 61, 62, and 69 on the stacking apparatus(es) 60 connected downstream of the inspection apparatus 50 can be two or more. The number of flappers F1 and F2 in each apparatus can be one or more.

[Control Configuration]

<Control Apparatus>

FIG. 2 is a control block diagram of the image forming system 100. The control apparatus 40 includes a central processing unit (CPU) 201 and a memory 210. The CPU 201 performs functions of a setting unit 202 and an inspection control unit 205. The setting unit 202 and the inspection control unit 205 may be individually implemented by an application-specific integrated circuit (ASIC).

The operation unit 20 includes a display device 21 serving as a display unit for outputting information to the user, and an input device 22 to receive instructions from the user. Examples of the display device 21 include a display. Examples of the input device 22 include a touchscreen, a keyboard, a mouse, hardware keys, and software keys. The operation unit 20 may include an audio circuit and a speaker for outputting messages to the user.

The setting unit 202 receives various settings including sheet information, inspection items, and inspection levels. The sheet information includes the type of sheet P and the length of the sheet P in the conveyance direction (may be referred to as a longitudinal direction). The inspection levels indicate the degree of image inspection. The setting unit 202 stores setting data 212 that is image inspection-related information, such as the sheet information, inspection items, and inspection levels set by the user via the display device 21 into the memory 210.

The memory 210 also stores reference data 211. The reference data 211 is image data on a reference image to be used as a criterion of image inspection. The reference data 211 may be document image data (raster image processing [RIP] image data) linked with a job received via a host computer outside the image forming system 100, for example. The reference data 211 may be image data obtained by reading one or more sheets on which images corresponding to the reference image are formed, for example.

The inspection control unit 205 controls the inspection apparatus 50 based on the setting data 212. For example, in response to a request for the reference data 211 from the inspection apparatus 50, the inspection control unit 205 transmits the reference data 211 to the inspection apparatus 50. The inspection control unit 205 obtains image inspection result information from the inspection apparatus 50. The inspection control unit 205 controls the flappers F1 and F2 to discharge the sheet P to a user-specified one of the sheet trays 61, 62, and 69 based on the inspection result.

The stacking apparatuses 60 drive a motor M1 to rotate the conveyance rollers 63. The stacking apparatuses 60 drive solenoids SL1 and SL2 to switch the flappers F1 and F2. A sheet P is thereby guided and conveyed to one of the sheet trays 61 and 62 or the stacking apparatus 60c. For example, in a case where a result of the image inspection by the inspection apparatus 50 is failed, the sheet P determined as failed is discharged to a sheet tray 62. The image forming apparatus 30 also includes solenoids for driving flappers and motors for driving conveyance rollers, which are not illustrated in the diagram.

<Inspection Apparatus>

Figure 3:
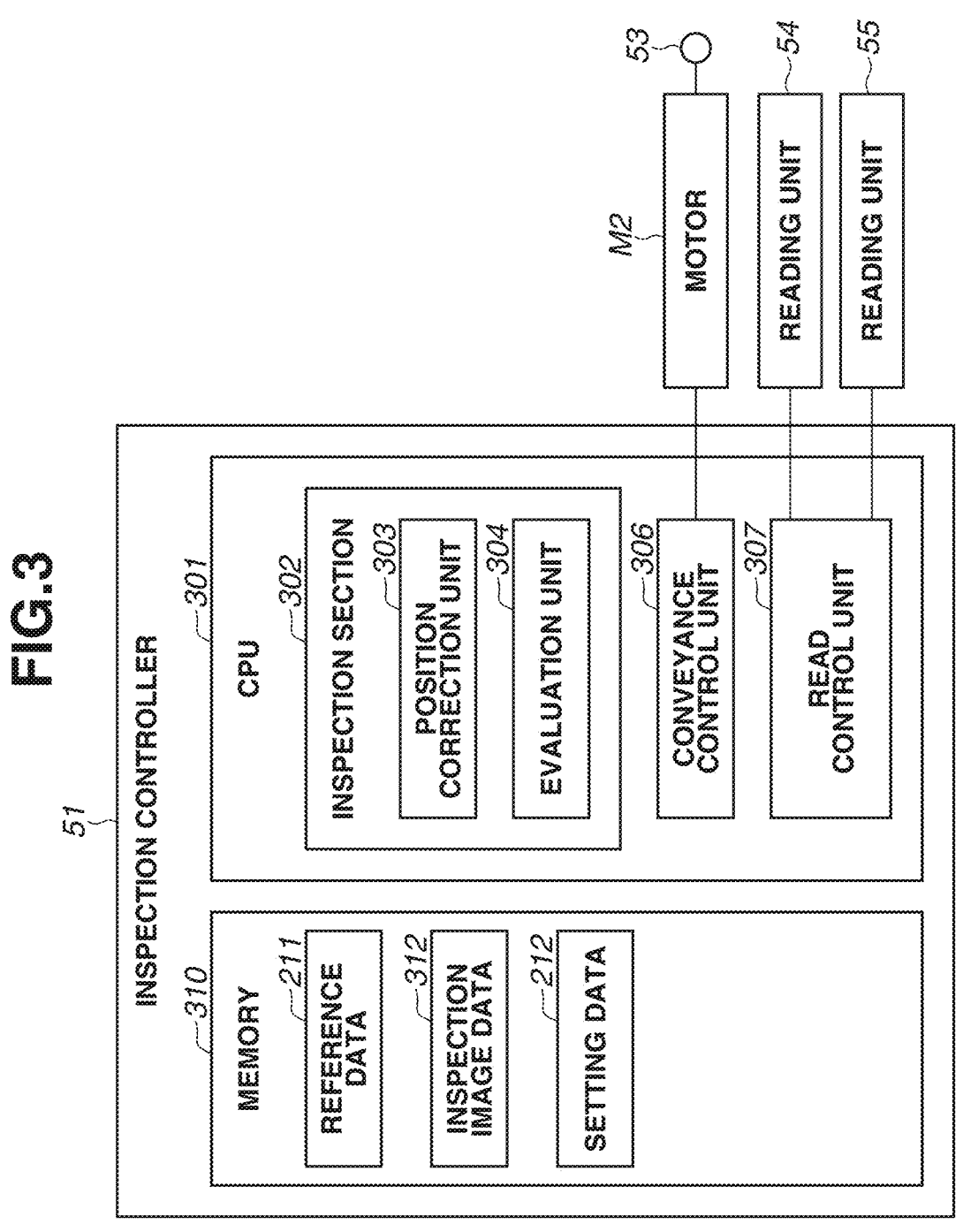
FIG. 3 is a control block diagram illustrating an inspection apparatus.

FIG. 3 is a control block diagram of the inspection apparatus 50. An inspection controller 51 disposed in the inspection apparatus 50 includes a CPU 301 and a memory 310. The CPU 301 performs functions of an inspection section 302, a conveyance control unit 306, and a read control unit 307. The inspection section 302, the conveyance control unit 306, and the read control unit 307 may be individually implemented by an ASIC.

The inspection section 302 performs image inspection based on the setting data 212 received from the control apparatus 40, and transmits the inspection result to the control apparatus 40. The CPU 301 may be configured to perform the inspection. An external personal computer (PC) connected to the image forming system 100 may be configured to perform the inspection. The inspection section 302 performs functions of a position correction unit 303 and an evaluation unit 304. The position correction unit 303 and the evaluation unit 304 may be individually implemented by an ASIC.

The position correction unit 303 performs position correction on images to be read by the reading units 54 and 55. If the reading units 54 and 55 read a sheet P lying askew, the sheet P appears askew in the read images. The position correction unit 303 corrects a position of a sheet P in the reading result by rotating the reading result and/or shifting the coordinates.

Inspection image data (read image data) 312 is image data generated by the reading units 54 and 55 reading the sheet P. The evaluation unit 304 compares the reference data 211 with the inspection image data 312 and determines whether the image formed on the sheet P satisfy the inspection criterion. In other words, the evaluation unit 304 functions as an inspection unit.

For example, in a case where an inspection item is "misalignment" and an amount of deviation between an image position of the reference data 211 and the image position of the inspection image data 312 is less than or equal to a predetermined value, the evaluation unit 304 determines that the image quality is successful (the image is not defective). In a case where the amount of deviation exceeds the predetermined value, the evaluation unit 304 determines that the image quality is failed (the image is defective). In other words, that the amount of deviation between the image position of the reference data 211 and the image position of the inspection image data 312 is less than or equal to the predetermined value corresponds to satisfaction of the inspection criterion. That the amount of deviation between the image position of the reference data 211 and the image position of the inspection image data 312 is greater than the predetermined value corresponds to dissatisfaction of the inspection criterion. Alternatively, the absolute position of the image of the inspection image data 312 with respect to sheet edges may be inspected.

In a case where an inspection item is set to "black spot" and a size of black spot that is absent in the image of the reference data 211 and present in the image of the inspection image data 312 is less than or equal to a determination threshold, the evaluation unit 304 determines that the image quality is successful. More specifically, the black spot corresponds to a noise image that is absent in the image corresponding to the reference data 211 but present in the image corresponding to noise-reduced inspection image data 312. In a case where the size of the black spot exceeds the determination threshold, the evaluation unit 304 determines that the image is failed. In other words, that the size of the black spot does not exceed the determination threshold corresponds to satisfaction of the inspection criterion. That the size of the black spot exceeds the determination threshold corresponds to dissatisfaction of the inspection criterion.

In a case where an inspection item is "streak" and a length of a streak image extending in the conveyance direction is less than a predetermined length, for example, the evaluation unit 304 determines that the image quality is successful. In a case where the length of the streak image extending in the conveyance direction is greater than or equal to the predetermined length, the evaluation unit 304 determines that the image quality is failed. In other words, that the length of the streak image extending in the conveyance direction is less than the predetermined length corresponds to satisfaction of the inspection criterion. That the length of the streak image extending in the conveyance direction is greater than or equal to the predetermined length corresponds to dissatisfaction of the inspection criterion.

In a case where an inspection item is "tint", the evaluation unit 304 performs tint inspection based on a difference value between red (R) image data (luminance data) in the reference data 211 and R image data (luminance data) in the inspection image data 312, for example. More specifically, in a case where the difference value is greater than or equal to a predetermined value, the evaluation unit 304 determines that the image quality is failed. In a case where the difference value is less than the predetermined value, the evaluation unit 304 determines that the image quality is successful. In other words, that the difference value is less than the predetermined value corresponds to satisfaction of the inspection criterion. That the difference value is greater than or equal to the predetermined value corresponds to dissatisfaction of the inspection criterion. The evaluation unit 304 performs similar processing on green (G) and blue (B) as well.

As described above, the reading units 54 and 55 are used to inspect quality of images formed by the image forming apparatus 30. For example, in a case where a difference between a pixel value of the image data corresponding to the reference data 211 and a pixel value of the inspection image data 312 is less than a predetermined value, the evaluation unit 304 determines that the image quality is successful. In a case where the difference between the pixel value of the image data corresponding to the reference data 211 and the pixel value of the inspection image data 312 is greater than or equal to the predetermined value, the evaluation unit 304 determines that the image quality is failed. In other words, that the difference between the pixel value of the image data corresponding to the reference data 211 and the pixel value of the inspection image data 312 is less than the predetermined value corresponds to satisfaction of the inspection criterion. That the difference between the pixel value of the image data corresponding to the reference data 211 and the pixel value of the inspection image data 312 is greater than or equal to the predetermined value corresponds to dissatisfaction of the inspection criterion.

The conveyance control unit 306 drives a motor M2 to rotate the conveyance roller 53. The read control unit 307 controls the reading units 54 and 55 to read the sheet P and generate the inspection image data 312. The reading unit 54 reads a first side of the sheet P. The reading unit 55 reads a second side of the sheet P. With this configuration, the inspection apparatus 50 can inspect the images on both sides of the

[Setting Screens]

Figure 4:
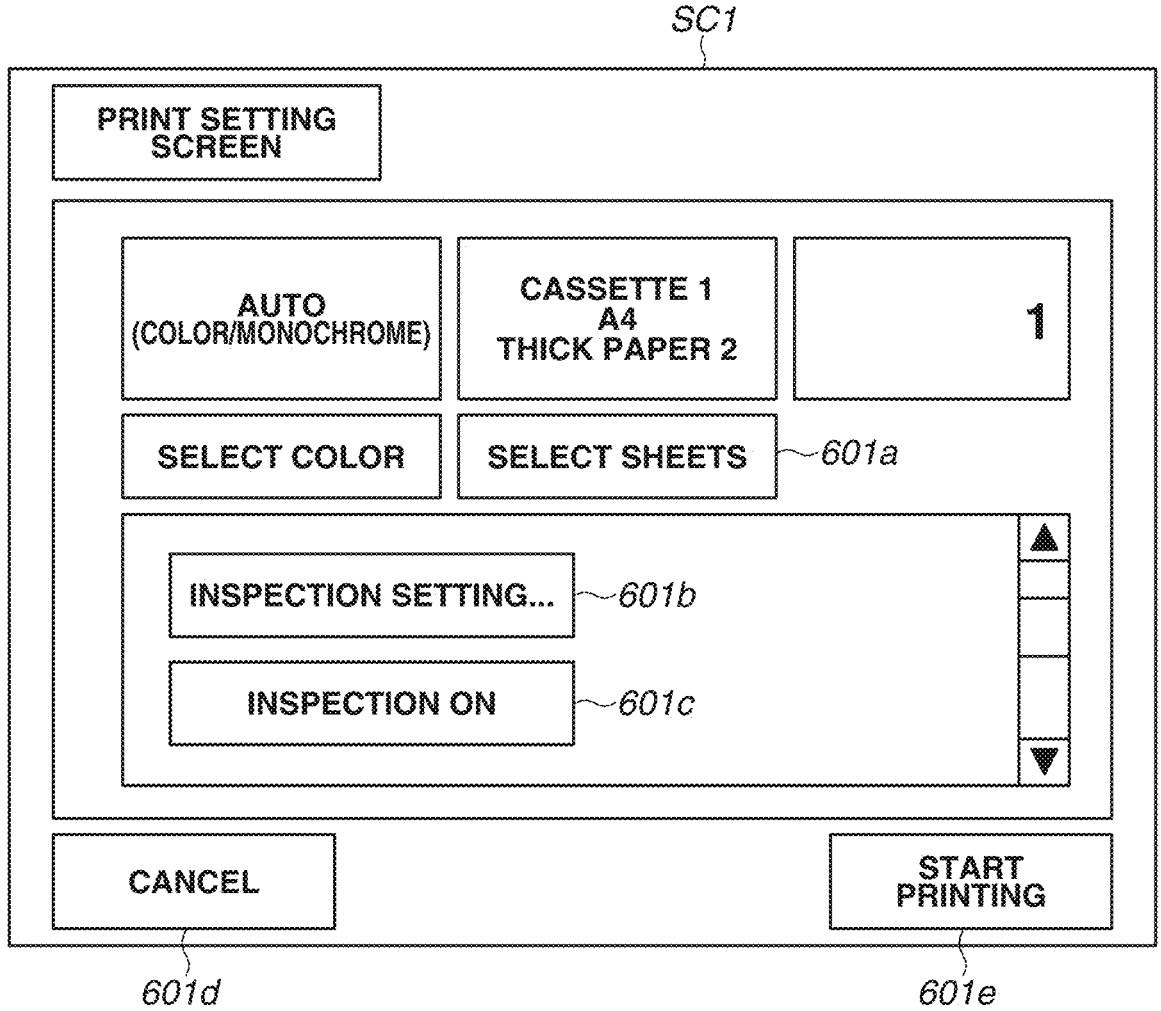
FIG. 4 is a diagram illustrating a print setting screen.

FIG. 4 is a diagram illustrating a print setting screen SC1. The print setting screen SC1 displays a button 601a for setting of a size and a grammage of sheets P to be printed and a sheet storage tray 11, and a button 601b for a transition from the print setting screen SC1 to an inspection setting screen SC2. The print setting screen SC1 also displays a button 601c for selection of whether the inspection function is turned ON or OFF, a button 601d for cancellation of the settings, and a button 601e for a start of printing.

In response to the button 601c with "INSPECTION ON" displayed being pressed, the display on the print setting screen SC1 is switched from "INSPECTION ON" to "INSPECTION OFF". In response to the button 601c with "INSPECTION OFF" displayed being pressed, the display on the print setting screen SC1 is switched from "INSPECTION OFF" to "INSPECTION ON". In response to the button 601e being pressed with the button 601c displaying "INSPECTION ON", the image on the sheet P is inspected (more specifically, a first job to form an image on the sheet P using the image forming apparatus 30 and inspect the image on the sheet P using the inspection apparatus 50 is executed). In response to the button 601e being pressed with the button 601c displaying "INSPECTION OFF", the image on the sheet P is not inspected (more specifically, a second job to form an image on the sheet P using the image forming apparatus 30 and not to inspect the image on the sheet P using the inspection apparatus 50 is executed).

In response to the button 601d being pressed, the print setting screen SC1 transitions to an initial screen (not illustrated).

Figure 5:
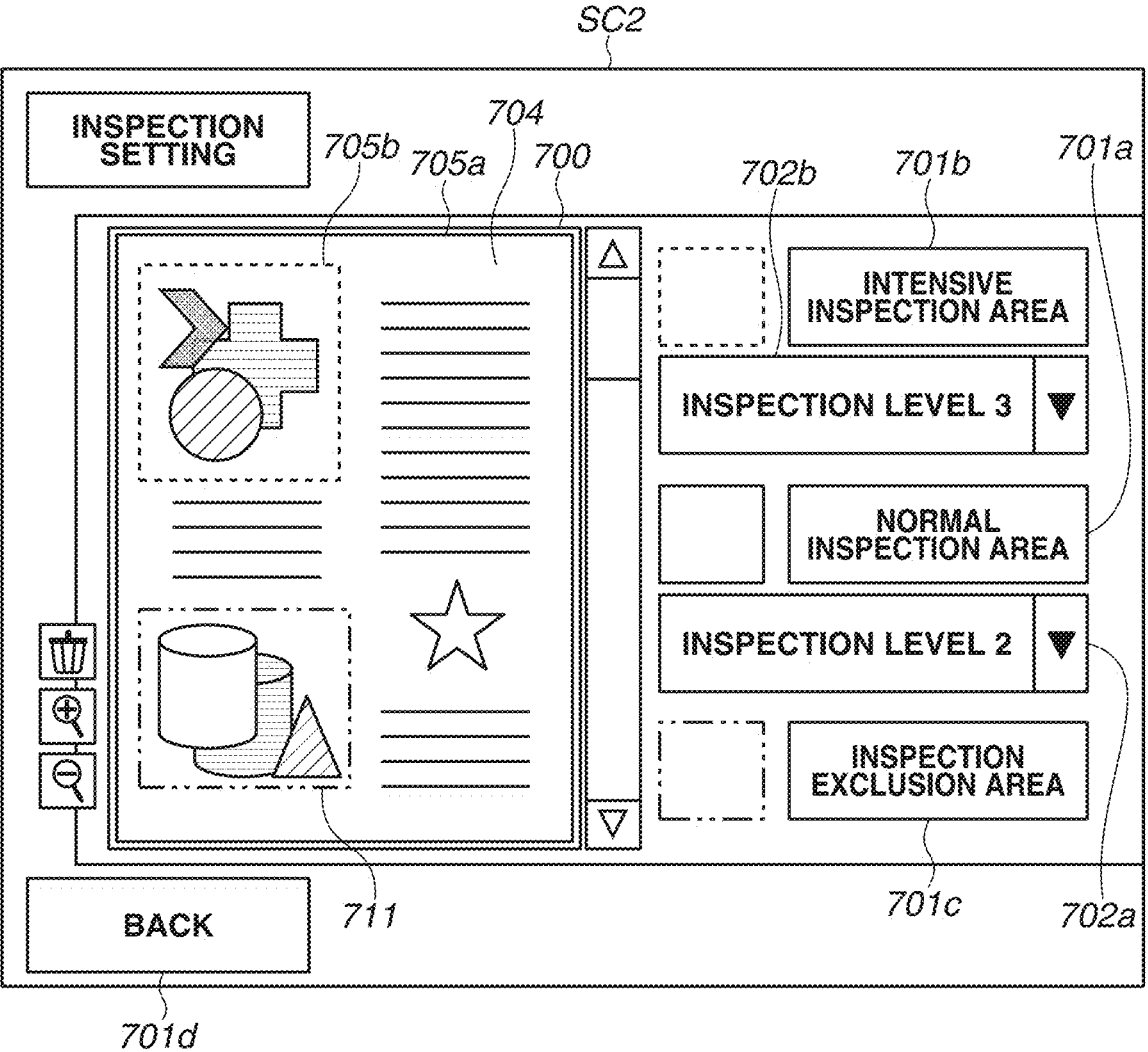
FIG. 5 is a diagram illustrating an inspection setting screen.

FIG. 5 is a diagram illustrating the inspection setting screen SC2. The inspection setting screen SC2 is a screen via which the user inputs an instruction to set inspection areas 705 which are to be subjected to quality inspection by the inspection apparatus 50. In FIG. 5, a display area 700 displays an image-to-be-printed 704, inspection areas 705a and 705b, and an inspection exclusion area 711.

The inspection areas 705a and 705b and the inspection exclusion area 711 are set using the mouse or touchscreen that is a part of the input device 22. The inspection area 705a is a normal inspection area set by operating a button 701a. An example of the normal inspection area is an area to be subjected to inspection with normal settings. A menu 702a is a pull-down menu for a setting of an inspection level (inspection accuracy) to be applied to the inspection area 705a. In the present exemplary embodiment, inspection level 1 has the lowest inspection accuracy. The numeral of the inspection level increases with an increase in the inspection accuracy (the stricter the inspection).

The inspection area 705b is an intensive inspection area set by an operation performed on a button 701b. An example of the intensive inspection area is an area to be subjected to high-accuracy inspection. In the example illustrated in FIG. 5, high-accuracy inspection is to be performed on figures such as a circle and a cross.

A menu 702b is a pull-down menu for a setting of the inspection level (inspection accuracy) to be applied to the inspection area 705b. Pull-down menus may be referred to as drop-down lists.

The inspection exclusion area 711 is an area which is set by an operation performed on a button 701c and is to be not subjected to inspection. In the exemplary embodiment, the cylindrical and triangular figures in the inspection exclusion area 711 are not needed to be inspected with high accuracy. The area including such figures can therefore be set as the inspection exclusion area 711. In such a manner, the inspection level can be set with respect to each area included in the image-to-be-printed 704. This means that the user can set appropriate successful criteria. As a result, print products having allowable quality are determined to be successful. This reduces unnecessary reprints and improves productivity. Wasteful disposal of sheets is also reduced.

A button 701d is a button for issuance of an instruction to return to the initial screen, or print setting screen SC1. The button 701d may be implemented as a cancel button. In such a case, in response to the button 701d being pressed, the inspection settings input via the inspection setting screen SC2 are discarded. In a case where the button 701*d* is implemented as a cancel button, an OK button to enable the inspection settings and return to the print setting screen SC1 is also implemented.

[Shading Correction]

<Calculation of Shading Correction Coefficients>

Figure 6A:
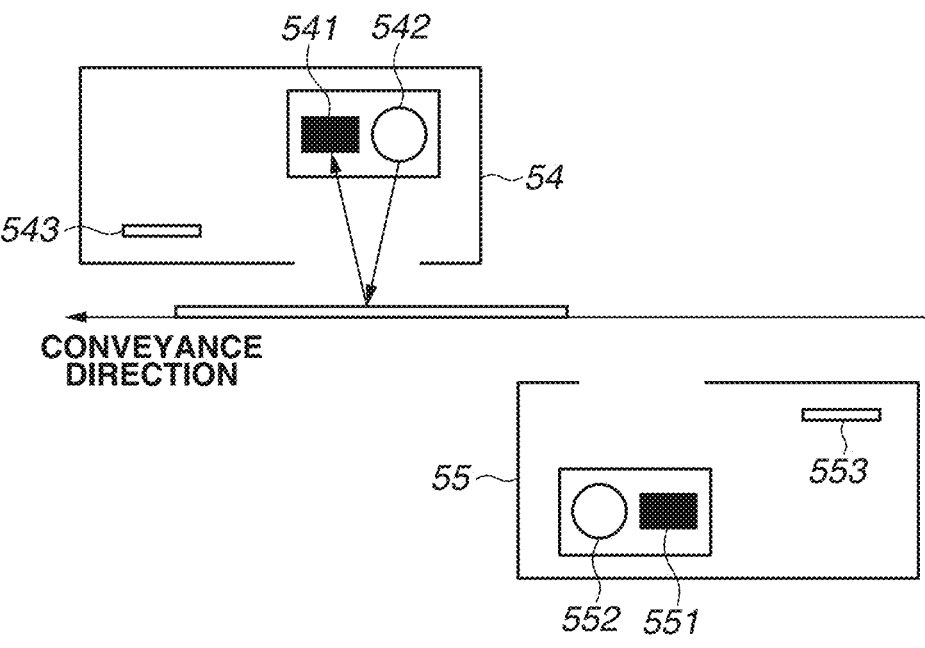
FIG. 6A is a diagram illustrating an example of a configuration of reading units for reading images on a sheet.

Next, shading correction will be described. FIG. 6A is a diagram illustrating an example of the configuration of the reading units 54 and 55. As illustrated in FIG. 6A, the reading unit 54 includes a reading sensor 541, a light-emitting diode (LED) 542, and a white reference plate 543 serving as a reference member. The reading unit 55 includes a reading sensor 551, an LED 552, and a white reference plate 553 serving as a reference member. While a method for calculation of shading correction coefficients for the reading unit 54 is described below, a similar method is also employed for the reading unit 55.

In FIG. 6A, the reading sensor 541 and the LED 542 are disposed at a first position. The reading unit 54 being at the first position reads an image on the sheet P passing the reading position.

Figure 6B:
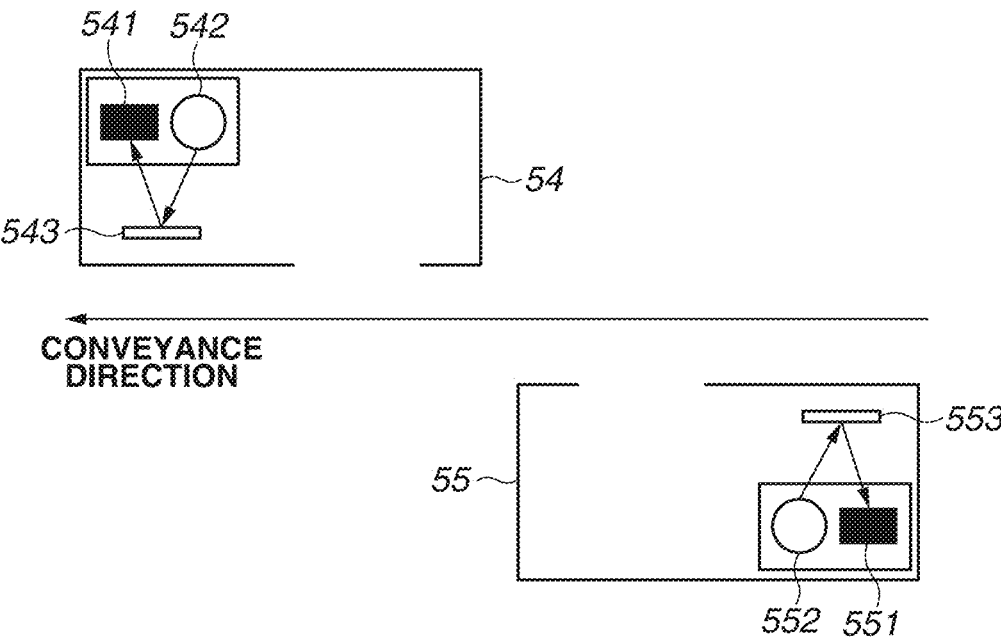
FIG. 6B is a diagram illustrating positions of the reading units in reading of white reference plates.

In reading the white reference plate 543, the reading sensor 541 and the LED 542 move to a second position where the white reference plate 543 can be read. FIG. 6B is a diagram illustrating a state where the reading sensor 541 and the LED 542, and the reading sensor 551 and the LED 552, are moved to respective second positions. The second position of the reading unit 54 is directly above the white reference plate 543, for example. The second position of the reading unit 55 is directly below the white reference plate 553. The reading sensor 541 and the LED 542 are moved by a motor (not-illustrated). The reading sensor 551 and the LED 552 are moved by another motor (not-illustrated).

The CPU 301 calculates the shading correction coefficients for the reading unit 54, based on a result of the reading of the white reference plate 543 by the reading unit 54. Similarly, the CPU 301 calculates the shading correction coefficients for the reading unit 55, based on a result of the reading of the white reference plate 553 by the reading unit 55.

Figure 7A:
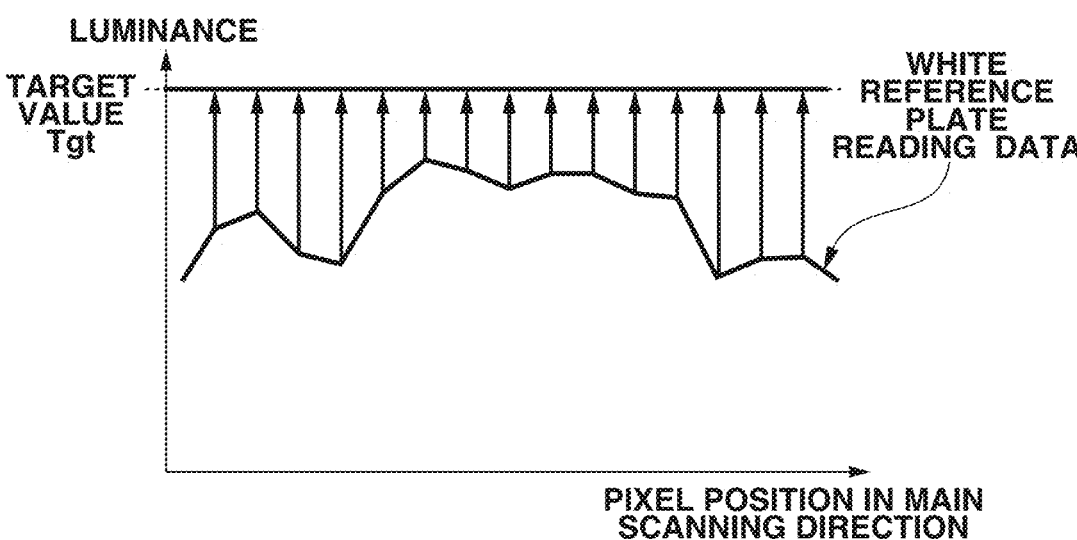
FIG. 7A is a chart illustrating a relationship between actual measurements and target values of white reference plate reading data.
Figure 7B:
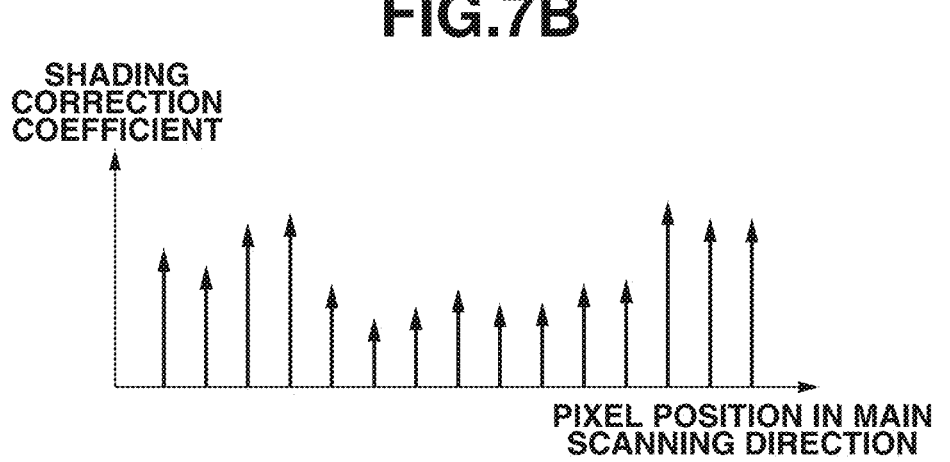
FIG. 7B is a schematic diagram illustrating magnitudes of shading correction coefficients at respective positions in a main scanning direction by lengths of arrows.

The shading correction coefficients will now be described. FIG. 7A is a chart illustrating a relationship between luminance (white reference plate reading data) obtained by the reading unit 54 reading the white reference plate 543 and luminance (target value Tgt) intended to be obtained by reading the white reference plate 543. The CPU 301 calculates a correction coefficient with which the value of the white reference plate reading data obtained by the reading unit 54 reading the white reference plate 543 is corrected into the target value Tgt at each position in a main scanning direction (sheet width direction). FIG. 7B is a schematic diagram illustrating the degree of the shading correction coefficient at each position in the main scanning direction by the length of an arrow. The shading correction coefficients are stored in the memory 310. The CPU 301 performs shading correction on the image data obtained by the reading units 54 and 55 reading the images on the sheet P, using the shading correction coefficients stored in the memory 310. An example of the shading correction is processing to correct, based on the shading correction coefficients, an output which is output from each pixel of the reading sensor 541 when the reading sensor 541 reads the image on the sheet P. The shading correction can be said to be processing for reducing variations among outputs of a plurality of pixels.

10

<Timing to Read White Reference Plates>

Prolonged reading operation by the reading units 54 and 55 increases the temperature of the reading sensor 541. This changes the reading characteristic (output from each pixel) of the reading sensor 541. The CPU 301 therefore moves the reading sensor 541 and the LED 542 to the second position and causes the reading sensor 541 to read the white reference plate 543 during the first job. The CPU 301 then calculates the shading correction coefficients for the reading sensor 541, based on the reading result of the white reference plate 543, and stores the shading correction coefficients in the memory 310. The same applies to the reading unit 55, and the CPU 301 calculates the shading correction coefficients for the reading sensor 551, based on the reading result of the white reference plate 553, and stores the shading correction coefficients in the memory 310.

<Control in Reading White Reference Plates>

In a configuration discussed in United States Patent Application Publication No. 2021/00382421 where an image on a sheet passing the reading position is not read in reading the reference member (white reference plate), there arises an issue that some sheets are produced without image inspection. An example of the control in reading the white reference plates 543 and 553 according to the present exemplary embodiment will now be described. The application of the following configuration can prevent both a reduction in the reading accuracy of images on sheets P and production of sheets not subjected to image inspection. In the following description, a shading operation includes the reading sensor 541 moving to the second position, reading the white reference plate 543, and returning to the first position.

When the first job (inspection job) is started, the CPU 201 controls the pickup roller 13 to feed sheets P stacked on the sheet storage tray 11 one by one at predetermined time intervals. The timing at which the pickup roller 13 conveys the sheets P is controlled to be constant with this control. More specifically, the CPU 201 controls the pickup roller 13 to set a length (distance) between the trailing edge of a preceding sheet in the conveyance direction and the leading edge of the subsequent sheet in the conveyance direction to be a first length (predetermined distance).

After a lapse of a predetermined time since the start of the first job, the CPU 201 controls the pickup roller 13 to set a time interval (feeding interval) between a timing when a first sheet is fed and a timing when a second sheet immediately subsequent to the first sheet is fed to be longer than the predetermined time interval. More specifically, the CPU 201 controls the pickup roller 13 to set a distance between the trailing edge of the first sheet and the leading edge of the second sheet to be a second length. The CPU 201 delays the timing when the pickup roller 13 conveys the second sheet to set the distance between the trailing edge of the first sheet and the leading edge of the second sheet to be greater than a predetermined distance. A time period from when the trailing edge of the first sheet passes the reading position to when the leading edge of the second sheet reaches the reading position is longer than a time period taken by the reading units 54 and 55 to complete the shading operation. The white reference plates 543 and 553 can be read in a time period from a timing when the trailing edge of the first sheet passes the reading position to a timing when the leading edge of the second sheet reaches the reading position. The second length is longer than the first length. In other words, if the distance is the first length, reading of the white reference plates 543 and 553 is not completed within the time period from a timing when the trailing edge of a preceding sheet passes the reading position to a timing when the leading edge of a subsequent sheet reaches the reading position.

The CPU 201 controls the pickup roller 13 to set the time interval from a timing when the second sheet is fed to a timing when a third sheet immediately subsequent to the second sheet is fed to be the predetermined time interval.

The CPU 201 notifies the CPU 301 of information about a sheet with a long feeding interval (in the foregoing example, the second sheet). More specifically, for example, in a case where the pickup roller 13 is controlled to set the feeding interval between an Nth sheet and an (N+1)th sheet after the start of the first job to be longer than the predetermined time interval, the CPU 201 notifies the CPU 301 that the feeding interval between the Nth sheet and the (N+1)th sheet is longer than the predetermined time interval. As for the shading operation for the second and subsequent times after the start of the first job, the CPU 201 notifies the CPU 301 that the feeding interval between the Nth sheet and the (N+1)th sheet after the previous shading operation is longer than the predetermined time interval.

The CPU 301 performs the shading operation after completion of reading the image on the Nth sheet by the reading units 54 and 55. Specifically, the CPU 301 moves the reading unit 54 (55) to the second position, causes the reading unit 54 (55) to read the white reference plate 543 (553), and moves the reading unit 54 (55) to the first position. The reading unit 54 (55) then reads the image on the (N+1)th sheet. In other words, the CPU 301 performs the shading operation in the time period from when the trailing edge of the Nth sheet passes the reading position to when the leading edge of the (N+1)th sheet reaches the reading position. The shading operation may include the CPU 301 calculating the shading correction coefficients.

The CPU 201 performs the foregoing control each time the predetermined time elapses.

In a case where the first job is not executed (the second job without inspection is executed), the white reference plates 543 and 553 are not read since reading by the reading units 54 and 55 is not performed. In such a case, the interval is controlled to the first length, for example.

Figure 8:
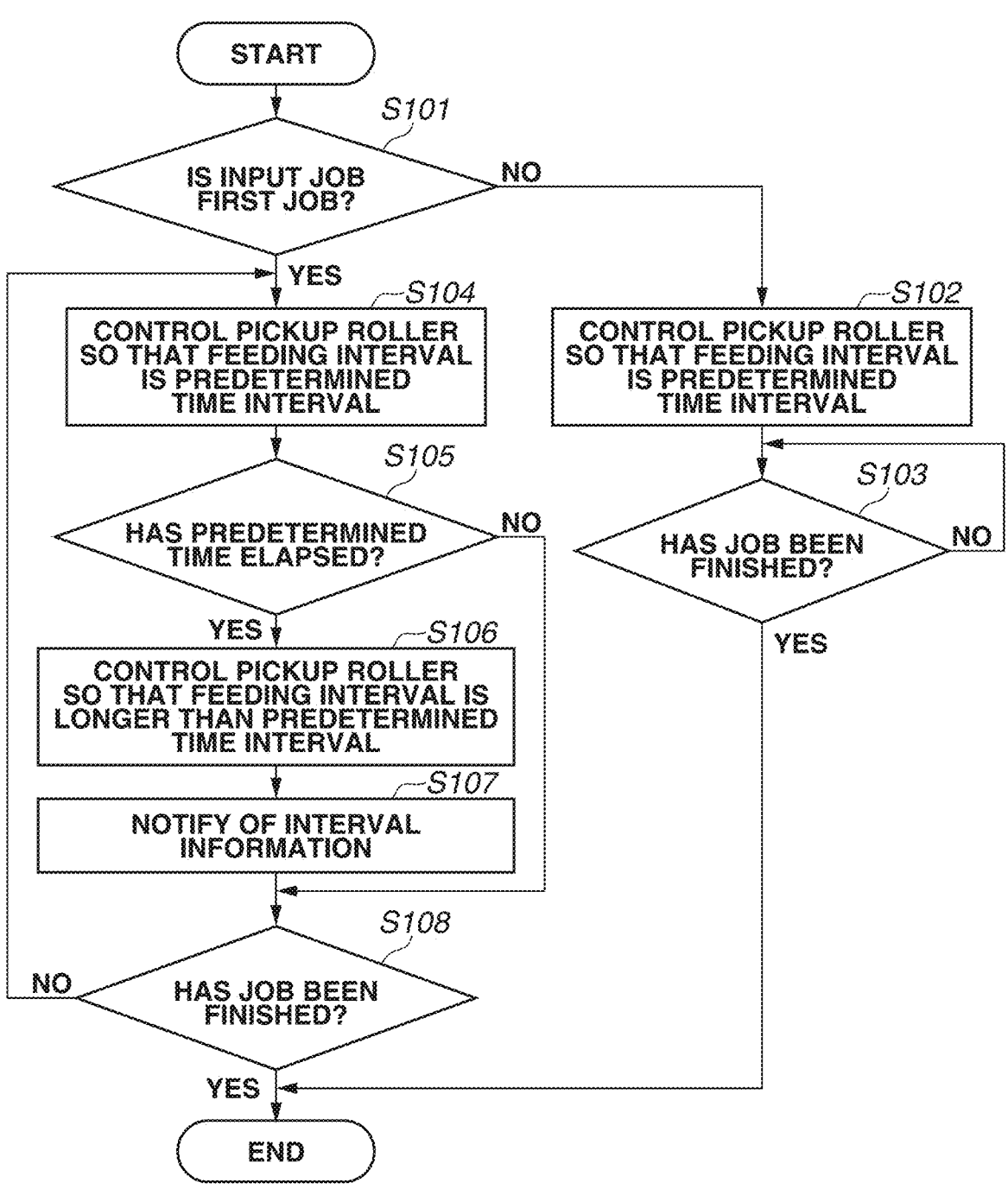
FIG. 8 is a flowchart of control in first and second jobs.

FIG. 8 is a flowchart of the control in the first and second jobs. The processing of the flowchart illustrated in FIG. 8 is performed by the CPU 201 in execution of a job.

In step S101, in a case where the CPU 201 determines that the input job is not the first job (NO in step S101), the processing proceeds to step S102. In step S102, the CPU 201 controls the image forming apparatus 30 to set the interval (feeding interval) to be the first length (predetermined time interval).

In step S103, in a case where the CPU 201 determines that the job has been finished (YES in step S103), the processing of this flowchart ends.

On the other hand, in step S101, in a case where the CPU 201 determines that the input job is the first job (YES in step S101), the processing proceeds to step S104. In step S104, the CPU 201 controls the pickup roller 13 to set the feeding interval to be the predetermined time interval.

In step S105, in a case where the CPU 201 determines that the predetermined time has not elapsed since the start of the job (NO in step S105), the processing proceeds to step S108.

In step S105, in a case where the CPU 201 determines that the predetermined time has elapsed since the start of the job (YES in step S105), the processing proceeds to step S106. In step S106, the CPU 201 controls the pickup roller 13 to set the feeding interval to be longer than the predetermined time interval.

In step S107, the CPU 201 notifies the CPU 301 of information (interval information) about the sheet with a long feeding interval.

In step S108, in a case where the CPU 201 determines that the job has not been finished (NO in step S108), the processing returns to step S104.

On the other hand, in a case where the CPU 201 determines that the job has been finished (YES in step S108), the processing of this flowchart ends.

Figure 9:
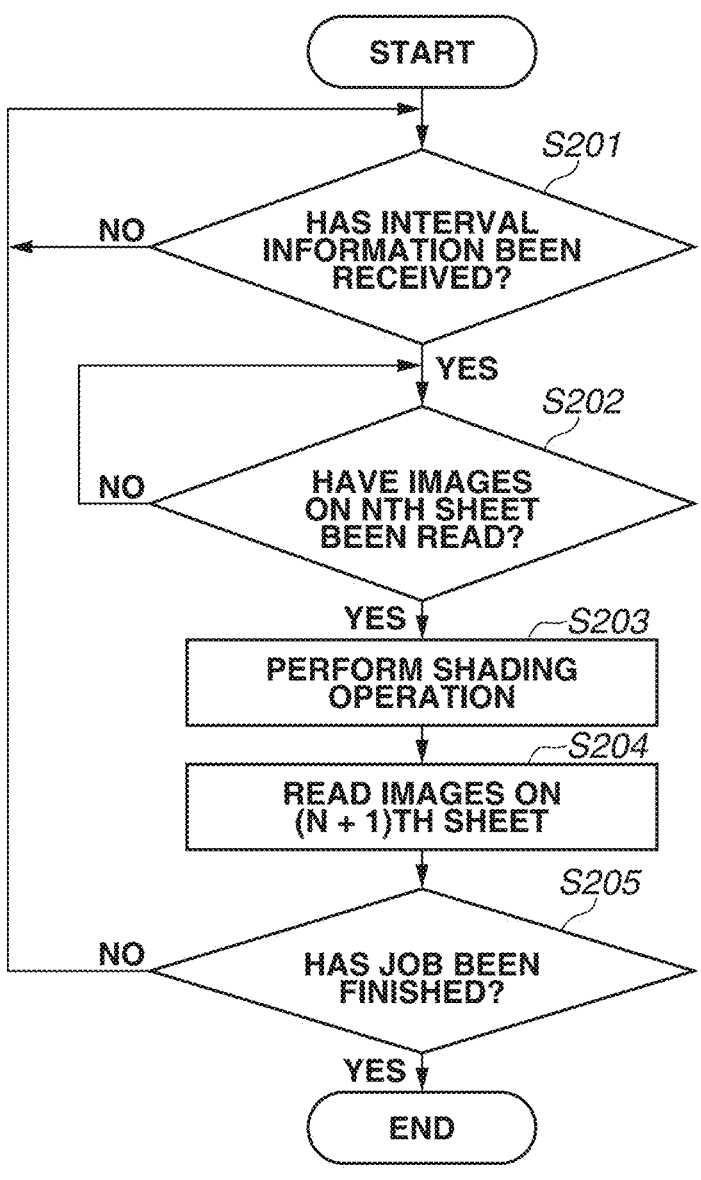
FIG. 9 is a flowchart of a shading operation in the first job.

FIG. 9 is a flowchart of the shading operation in the first job. The processing of flowchart illustrated in FIG. 9 is performed by the CPU 301 in executing the first job.

In step S201, in a case where the CPU 201 determines that the interval information has been received (YES in step S201), the processing proceeds to step S202.

In step S202, in a case where the CPU 201 determines that reading of the images on the Nth sheet by the reading units 54 and 55 has been performed (YES in step S202), the processing proceeds to step S203. In step S203, the CPU 301 causes the reading units 54 and 55 to perform the shading operation.

In step S204, the CPU 301 causes the reading units 54 and 55 to read the images on the (N+1)th sheet.

In step S205, in a case where the CPU 201 determines that the job has not been finished (NO in step S205), the processing returns to step S201.

On the other hand, in step S205, in a case where the CPU 201 determines that the job has been finished (YES in step S205), the processing of this flowchart ends.

As described above, after an elapse of the predetermined time since the start of the first job, the CPU 201 controls the pickup roller 13 to set the feeding interval between the trailing edge of the Nth sheet and the leading edge of the (N+1)th sheet to be longer than the predetermined time interval. Within the period from when the trailing edge of the Nth sheet passes the reading position to when the leading edge of the (N+1)th sheet reaches the reading position, the CPU 301 moves the reading unit 54 (55) to the second position, causes the reading unit 54 (55) to read the white reference plate 543 (553), and moves the reading unit 54 (55) to the first position. This configuration leads to achievement of an image forming apparatus capable of reading the white reference member within the period from when the trailing edge of a preceding sheet passes the reading position to when the leading edge of the subsequent sheet reaches the reading position. In other words, both updating of the shading correction coefficients and reading of the image on the Nth sheet and the image on the (N+1)th sheet by the reading unit 54 (55) are achieved at the same time. This configuration enables both updating of the shading correction coefficients and inspecting of the images on the Nth sheet and the images on the (N+1)th sheet at the same time. In other words, this configuration prevents both a reduction in reading accuracy of reading sensors and production of sheets not subjected to image inspection. Further, since the shading operation is performed without stopping the sheet conveyance, a reduction in the productivity of the image forming system 100 is prevented.

Further, the reduction in the productivity of the image forming system 100 is prevented in comparison to a case where the feeding interval is controlled to be a constant time interval longer than the predetermined time interval during the first job. Further, since the image inspection is performed based on a result of the reading on which shading correction has been performed using appropriate shading correction coefficients corresponding to temperature change, a reduction in inspection accuracy is prevented

In the foregoing description, the sheet conveyance timing of the pickup roller 13 is controlled to increase the interval between the trailing edge of the Nth sheet and the leading edge of the (N+1)th sheet. However, such a configuration is not restrictive. That is, the control of the sheet conveyance is not limited to the above-described control as long as each of a plurality of sheets reaches the reading position at a predetermined time interval during the first job (inspection processing). For example, the CPU 201 may be configured to control discharging of the plurality of sheets to cause each of the plurality of sheets to be discharged from the image forming apparatus 30 at a predetermined discharge interval. With such a configuration, in the shading operation during the first job (inspection processing s), the CPU 201 controls discharging of the (N+1)th sheet to prolong the discharge interval between a timing when the Nth sheet is discharged and a timing when the (N+1)th sheet is discharged in comparison with the predetermined discharge interval.

In the foregoing description, in a case where the shading operation is not performed, the plurality of sheets passes the reading position at the same predetermined time intervals. However, the sheet conveyance timing may be temporarily delayed or suspended in a case where the image data takes long to be loaded or inspected.

In the example illustrated in FIGS. 6A and 6B, the white reference plate 543 is configured to be read by the reading sensor 541 and the LED 542 moving between the first and second positions. However, the configuration for reading the white reference plate 543 is not limited thereto. For example, the white reference plate 543 may be configured to move between a position where the white reference plate 543 is retracted from the reading sensor 541 and the LED 542 and a position where the white reference plate 543 is read by the reading sensor 541. As another example, the reading sensor 541, the LED 542, and the white reference plate 543 may be configured to move. In other words, at least either the reading sensor 541 and the LED 542 or the white reference plate 543 may be configured to move. More specifically, such a configuration can be applicable as long as the positional relationship between the reading sensor 541 and the white reference plate 543 (positional relationship between the reading sensor 551 and the white reference plate 553) is switched between a first positional relationship and a second positional relationship. As employed herein, the first positional relationship refers to a positional relationship where the reading sensor 541 (551) reads the image on the sheet P passing the reading position. The second positional relationship refers to a positional relationship where the reading sensor 541 (551) reads the white reference plate 543 (553).

Figure 10A:
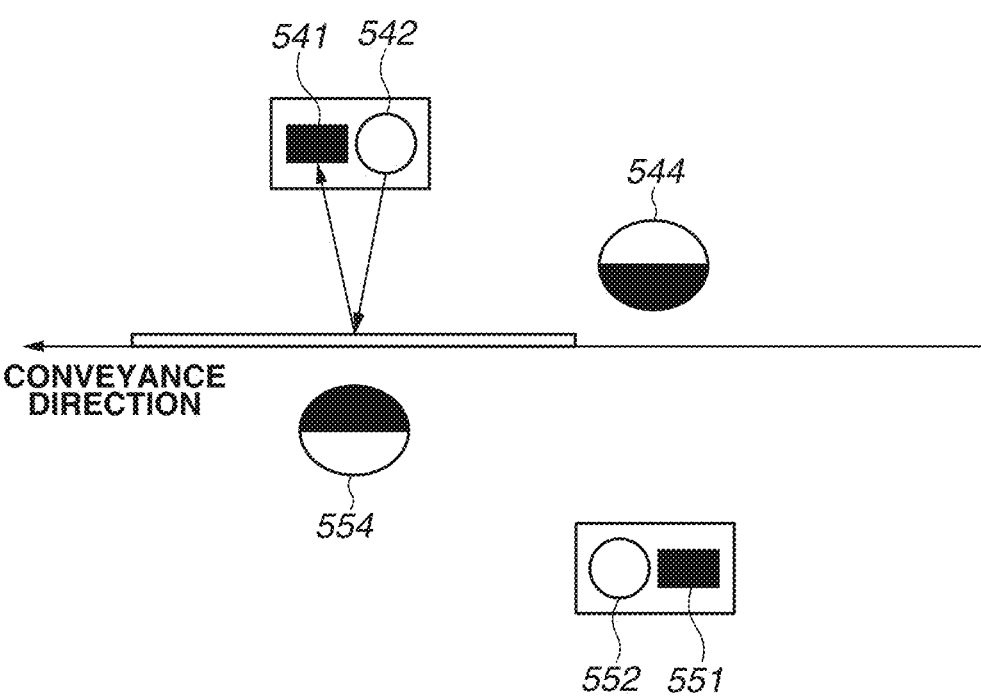
FIGS. 10A and 10B are diagrams illustrating a modification of white reference members.
Figure 10B:
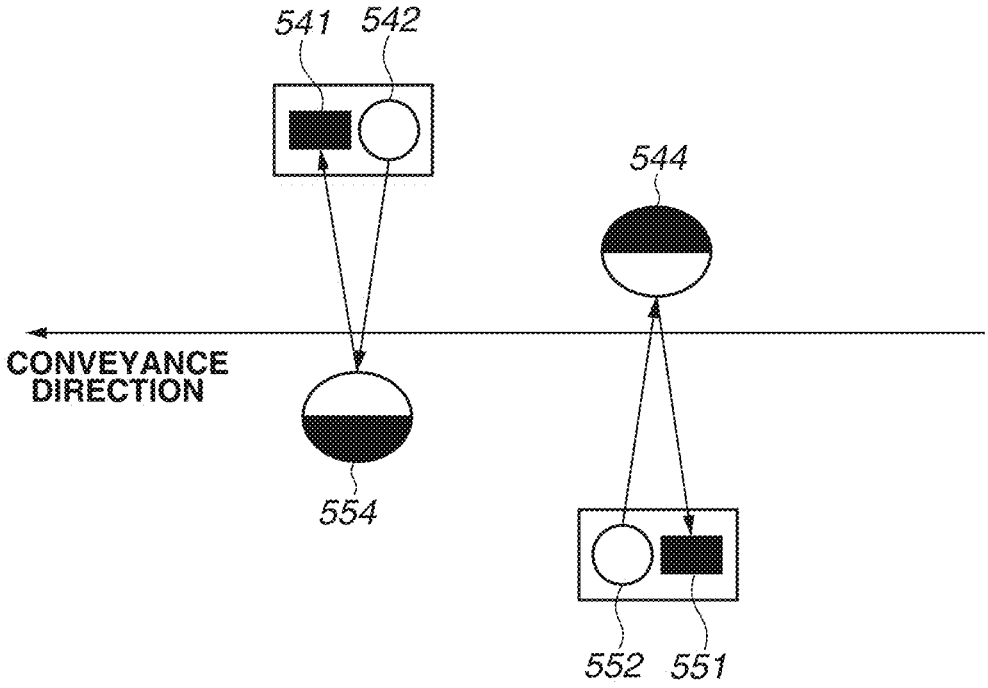

In the configuration illustrated in FIGS. 6A and 6B, the white reference plate 543 (553) is disposed on a side with the reading sensor 541 (551) with respect to the conveyance path (reading position) through which the sheet P is conveyed. However, the layout of the white reference plates 543 and 553 is not limited thereto. For example, as illustrated in FIGS. 10A and 10B, a roller 544 (roller 554) may be disposed on a side opposite to the reading sensor 541 of the reading unit 54 (the reading sensor 551 of the reading unit 55) with respect to the conveyance path (reading position) through which the sheet P is conveyed. In this configuration, for example, black parts of the rollers 544 and 554 are faced toward the reading sensors 541 and 551 in reading the images on the sheet P. In the shading operation, the rollers 544 and 554 are rotated (moved) by motors (not-illustrated) to control the orientation of the rollers 544 and 554, and white parts are faced toward the reading sensors 541 and

551. More specifically, in reading the images on the sheet P, the roller 544 (554) is controlled to be in a first orientation where the black part of the roller 544 (554) is faced toward the reading sensor 541 (551). In the shading operation, the roller 544 (554) is controlled to be in a second orientation where the white part of the roller 544 (554) is faced toward the reading sensor 541 (551). The shading correction coefficients are calculated based on results of the reading of the white parts of the rollers 544 and 554.

In the foregoing description, the white reference plate 543 is read each time when a predetermined time elapses during the first job. The CPU 201 determines the timing of the reading sensor 541 (551) reading the white reference plate 543 (553), based on the elapsed time during the first job. However, the execution timing of the shading operation is not limited to the control based on the elapsed time. For example, the white reference plate 543 may be read each time when the total number of read sheets reaches a predetermined number of sheets. The configuration is not limited as long as the feeding interval is controlled in the foregoing manner based on the timing to read the white reference plate 543.

In the foregoing description, the pickup roller 13 is controlled to set the feeding interval between the first and second sheets to be longer than the predetermined time interval, and then controlled to set the feeding interval between the second and third sheets to be the same as the predetermined time interval. Alternatively, for example, when a predetermined time has elapsed since the start of the first job, the CPU 201 may control the pickup roller 13 to set the feeding intervals between the preceding and subsequent sheets to be longer than the predetermined time interval while a predetermined number n of sheets is fed. In this case, the CPU 201 notifies the CPU 301 of information about the sheets fed at the time intervals longer than the predetermined time interval. Specifically, for example, the CPU 201 may notify the CPU 301 that the intervals during a period between the Nth and (N+n)th sheets after the start of the first job are the second length. The CPU 301 moves the reading unit 54 (55) to the second position, causes the reading unit 54 (55) to read the white reference plate 543 (553), and moves the reading unit 54 (55) to the first position at the intervals during the period from when the trailing edge of the Nth sheet passes the reading position to when the leading edge of the (N+n)th sheet reaches the reading position.

While, in the present exemplary embodiments, in a case where the first job is not executed (the second job without inspection is executed), the feeding intervals are controlled to be the predetermined time interval, this is not restrictive. For example, the feeding intervals may be controlled to be a second predetermined time interval.

The optical scanning devices, the photosensitive drums, the charging devices, the developing devices, and the fixing devices are included in an image forming unit.

A description will be given of a configuration where the inspection apparatus 50 reads images even in a case where the image inspection is not performed. The redundant description of configurations similar to the image forming system 100 will be omitted.

[Gradation Adjustment Control]

Figure 11:
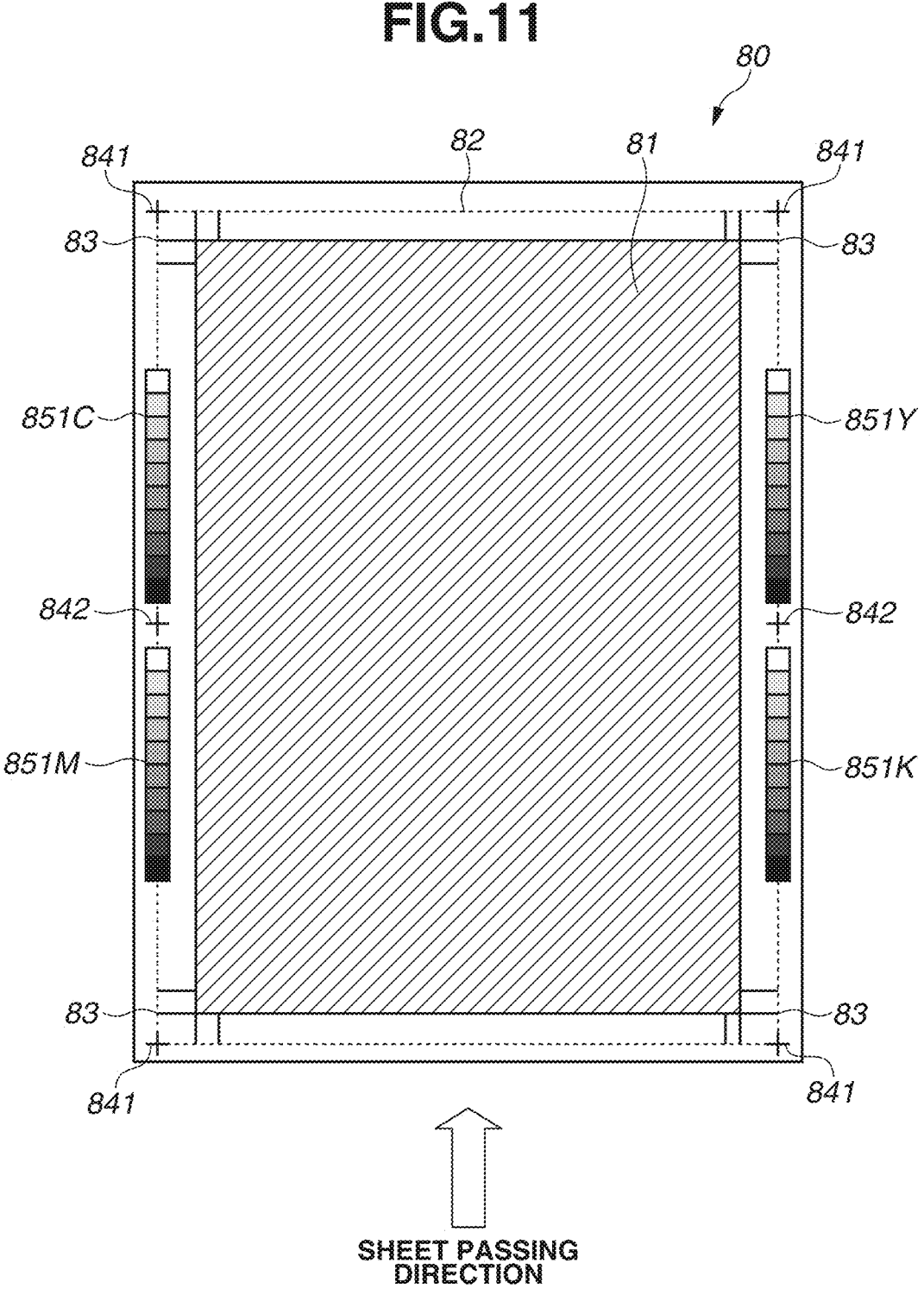
FIG. 11 is an explanatory diagram illustrating gradation adjustment images formed on a sheet by an image forming apparatus.

In the following description, control (adjustment mode) is performed to adjust gradations of images to be formed on sheets during the first job and the second job. FIG. 11 is an explanatory diagram illustrating gradation adjustment images formed on a sheet 80 by the image forming apparatus 30.

As illustrated in FIG. 11, an image area 81 is in the center of the sheet 80, and a non-image area 82 is between the periphery of the image area 81 and the sheet edges.

An image (user-input image) based on image data processed by the image forming apparatus 30 is formed on the image area 81. In other words, the image formed on the image area 81 is an image to be subjected to an inspection by the evaluation unit 304. The hatching lines indicating the image area 81 in FIG. 11 are for illustrative purposes only and not actually formed on the sheet 80.

Yellow, magenta, cyan, and black gradation adjustment images 851Y, 851M, 851C, and 851K serving as a test chart, front-back registration marks 841 and 842, and crop marks 83 are formed on the non-image area 82. In the following description, the gradation adjustment images 851Y, 851M, 851C, and 851K will be referred to as gradation adjustment images 851 unless the colors are distinguished.

The crop marks 83 are set by the user in advance. The crop marks 83 each include two overlapping L-shaped marks, and are formed in proximity to the four corners of the image area 81. The portion surrounded by the four crop marks 83 (area surrounded by the broken lines) forms the sheet cutting positions.

The gradation adjustment images 851 may be formed on any of the sheet margins. It is desirable that the gradation adjustment images 851 are formed on both ends of the sheet in the direction (sheet width direction) orthogonal to the sheet conveyance direction (sheet passing direction) as illustrated in FIGS. 6A and 6B. Specifically, two of the yellow, magenta, cyan, and black gradation adjustment images 851 are formed on one of the end areas of the sheet 80 in the transverse direction (width direction). The other two of the gradation adjustment images 851 are formed on the other end area of the sheet 80 in the width direction. In the present exemplary embodiment, the gradation adjustment image 851C and the gradation adjustment image 851M are formed on one of the end areas of the sheet 80 in the width direction. The gradation adjustment image 851Y and the gradation adjustment image 851K are formed on the other end area of the sheet 80 in the width direction.

The gradation adjustment images 851Y, 851M, 851C, and 851K each include a plurality of halftone patch images with gradually different gradation values. In FIG. 11, the gradation adjustment images 851 each include 10 halftone patch images. Each patch image has a length of 8 mm in the main scanning direction and a length of 12 mm in a sub scanning direction, for example. The main scanning direction corresponds to the width direction. The sub scanning direction corresponds to the conveyance direction.

In a case where the gradation values are expressed in 256 levels, the gradation values of the patch images arranged in a row in gradation adjustment images 851 are set to values between 0 and 255 so that differences between the gradation values of adjacent patch images are uniform. The gradation values of the patch images at the ends are set to 0 and 255. The patch images included in the gradation adjustment images 851 are not limited to yellow, magenta, cyan, or black. The patch images may be formed in R, G, B, and process black.

The size of the gradation adjustment images 851 is determined so that when a sheet of A3 size is conveyed portrait (297 mm in the main scanning direction×420 mm in the sub scanning direction), all the four color gradation adjustment images 851Y, 851M, 851C, and 851K can be formed within the sheet.

The patch images are read by the reading units 54 and 55. The CPU 201 updates a gradation correction table based on results of the reading so that differences between densities of the read patch images and target densities of the respective patch images decrease. The image forming apparatus 30 adjusts densities of images to be formed on sheets based on the updated gradation correction table. Specifically, the image forming apparatus 30 resets image forming conditions for image formation on sheets to reduce the differences between the densities of the read patch images and the target densities of the respective patch images decrease. This prevents a reduction in quality of images formed on sheets.

In the above-described manner, the image in the image area 81 among images read by the reading units 54 and 55 is inspected by the evaluation unit 304, and the patch images in the non-image area 82 are used for density adjustment by the CPU 201. Results of the reading by the reading units 54 and 55 are used for image inspection and density adjustment. The user may set whether to perform the density adjustment, via the operation unit 20.

<Control in Reading White Reference Plates>

A description will be given of control in reading the white reference plates 543 and 553.

The redundant description of the operation in the first job will be omitted. The reading units 54 and 55 read the images (patch images) on the sheets even in a case where the first job is not executed (the second job without inspection is executed). Results of the reading of the patch images are used for density adjustment as described above.

The CPU 201 does not change the feeding intervals during the second job. In other words, the feeding intervals are controlled to the predetermined time interval during the second job.

The CPU 301 performs the shading operation after a lapse of a predetermined time from when the second job has been started. Specifically, the CPU 301 moves the reading unit 54 (55) to the second position, causes the reading unit 54 (55) to read the white reference plate 543 (553), and moves the reading unit 54 (55) to the first position.

The images on a sheet or sheets passing the reading position during the shading operation are not read. In the second job, the density adjustment based on the patch images on the sheet(s) during the shading operation can be skipped, because not much influence is exerted on image quality since the patch images are formed on all sheets printed, and the density adjustment is performed each time the patch images are read. The shading operation may include calculating the shading correction coefficients.

The CPU 201 performs the foregoing control each time a predetermined time elapses.

As described above, in execution of the first job, the images on the sheets are inspected and the density adjustment control is performed on images. After a lapse of a predetermined time since the start of the first job, the CPU 201 controls the pickup roller 13 to set the feeding interval between the trailing edge of the Nth sheet and the leading edge of the (N+1)th sheet to be longer than the predetermined time interval. During a period from when the trailing edge of the Nth sheet passes the reading position to when the leading edge of the (N+1)th sheet reaches the reading position, the CPU 301 moves the reading unit 54 (55) to the second position, causes the reading unit 54 (55) to read the white reference plate 543 (553), and moves the reading unit 54 (55) to the first position. As a result, the CPU 201 can update the shading correction coefficients and also cause the reading unit 54 (55) to read an image on the Nth sheet and an image on the (N+1)th sheet. This configuration enables the achievements of inspection of the images on the Nth and (N+1)th sheets, adjustment of densities of images, and updating of the shading correction coefficients, at the same time. In other words, the configuration prevents a reduction in the reading accuracy of the reading sensors and an occurrence of production of sheets not subjected to the image inspection, without lowering quality of images formed on sheets. Since the images are inspected based on the reading results on which shading correction has been performed using appropriate shading correction coefficients corresponding to temperature change, a reduction in the inspection accuracy can be prevented.

In execution of the second job, images on sheets are not inspected and the density adjustment control on images is performed. The CPU 301 performs the shading operation after a lapse of a predetermined time since the start of the second job. Specifically, the CPU 301 moves the reading unit 54 (55) to the second position, causes the reading unit 54 (55) to read the white reference plate 543 (553), and moves the reading unit 54 (55) to the first position. The images on sheet(s) passing the reading position during the shading operation are not read. This configuration can prevent both a reduction in the productivity of the image forming system 100 due to the shading operation and a reduction in the quality of images formed on sheets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-068890, filed Apr. 19, 2023, which is hereby incorporated by reference herein in its entirety.

What is claimed is:

1. An inspection apparatus comprising:
a tray configured to stack sheets;
a conveyance member configured to convey a sheet from the tray;
a reading sensor including a plurality of pixels and configured to read an image on the sheet during a passage of the sheet conveyed by the conveyance member at a reading position;
a reference member configured to be read by the reading sensor, a reading result of the reference member by the reading sensor being used for shading correction to correct output of the plurality of pixels;
an inspection unit configured to inspect the image on the sheet read by the reading sensor; and
a controller configured to
control, in inspection processing where the reading sensor sequentially reads a plurality of sheets and the inspection unit inspects an image on each of the plurality of sheets, conveyance of the plurality of sheets to cause each of the plurality of sheets to reach the reading position at a predetermined time interval, and
set, in a case where the reading sensor reads the reference member during the inspection processing, a time interval from when a first sheet included in the plurality of sheets reaches the reading position to when a second sheet, immediately subsequent to the first sheet, included in the plurality of sheets reaches the reading position to be longer than the predetermined time interval, wherein the reading sensor reads the reference member during a period from when the reading sensor reads an image on the first sheet to when the reading sensor reads an image on the second sheet.

2. The inspection apparatus according to claim 1, wherein in the inspection processing, the controller is configured to control a timing of the conveyance member conveying the plurality of sheets one by one to cause the plurality of sheets to each reach the reading position at the predetermined time interval, and wherein the controller is configured to delay, in a case where the reading sensor reads the reference member during the inspection processing, a timing of the conveyance member conveying the second sheet.

3. The inspection apparatus according to claim 1, wherein in the inspection processing, each of the plurality of sheets is conveyed at a predetermined distance, and wherein in a case where the reading sensor reads the reference member during the inspection processing, a distance between a trailing edge of the first sheet and a leading edge of the second sheet is greater than the predetermined distance.

4. The inspection apparatus according to claim 1, wherein a positional relationship between the reading sensor and the reference member is switched between a first positional relationship and a second positional relationship, wherein the reading sensor reads the image on the sheet passing the reading position in the first positional relationship, and wherein the reading sensor reads the reference member in the second positional relationship.

5. The inspection apparatus according to claim 4, wherein the positional relationship is switched between the first positional relationship and the second positional relationship by movement of the reading sensor.

6. The inspection apparatus according to claim 4, wherein the reference member is disposed on a side with the reading sensor with respect to the reading position.

7. The inspection apparatus according to claim 4, wherein the reference member is disposed on a side opposite to the reading sensor with respect to the reading position.

8. The inspection apparatus according to claim 7, wherein the reference member is configured to be switched between a first orientation and a second orientation, wherein in a case where the reading sensor reads the image on the sheet passing the reading position, the reference member is controlled to be in the first orientation, and wherein in a case where the reading sensor reads the reference member, the reference member is controlled to be in the second orientation.

9. The inspection apparatus according to claim 1, wherein the controller determines a timing of the reading sensor reading the reference member, based on an elapsed time during the inspection processing.

10. An image forming system comprising:
an image forming apparatus configured to form an image on a sheet;
a reading apparatus configured to read the image on the sheet, the reading apparatus including
a conveyor configured to convey the sheet discharged from the image forming apparatus to a reading position,
a reading sensor including a plurality of pixels and configured to read the image on the sheet during a passage of the sheet at the reading position, and
a reference member configured to be read by the reading sensor, a reading result of the reference member by the reading sensor being used for shading correction to correct output of the plurality of pixels;

an inspection controller configured to inspect the image on the sheet read by the reading apparatus; and a controller configured to, control, in inspection processing where the reading sensor sequentially reads a plurality of sheets and an inspection unit inspects an image formed on each of the plurality of sheets by the image forming apparatus, conveyance of the plurality of sheets to cause each of the plurality of sheets to reach the reading position at a predetermined time interval, and set, in a case where the reading sensor reads the reference member during the inspection processing, a time interval from when a first sheet included in the plurality of sheets reaches the reading position to when a second sheet, immediately subsequent to the first sheet, included in the plurality of sheets reaches the reading position to be longer than the predetermined time interval, wherein the reading sensor reads the reference member during a period from when the reading sensor reads an image on the first sheet to when the reading sensor reads an image on the second sheet.

11. The image forming system according to claim 10, wherein in the inspection processing, the controller controls discharging of the plurality of sheets to set a discharging interval of each of the plurality of sheets discharged from the image forming apparatus to be a predetermined discharge interval, and wherein in a case where the reading sensor reads the reference member during the inspection processing, the controller controls discharging of the second sheet to set a discharge interval from when the image forming apparatus discharges the first sheet to when the image forming apparatus discharges the second sheet to be greater than the predetermined discharge interval.

12. The image forming system according to claim 10, wherein the image forming apparatus includes a tray configured to stack a sheet and a conveyance member configured to convey the sheet stacked on the tray, wherein the image forming apparatus forms the image on the sheet conveyed by the conveyance member, wherein in the inspection processing, the controller controls a timing of the conveyance member conveying each of the plurality of sheets to cause each of the plurality of sheets to reach the reading position at the predetermined time interval, and wherein in a case where the reading sensor reads the reference member during the inspection processing, the controller delays a timing of the conveyance member conveying the second sheet.

13. The image forming system according to claim 10, wherein in the inspection processing, each of the plurality of sheets is conveyed at a predetermined distance, and wherein in a case where the reading sensor reads the reference member during the inspection processing, a distance between a trailing edge of the first sheet and a leading edge of the second sheet is greater than the predetermined distance.

14. The image forming system according to claim 10, wherein a positional relationship between the reading sensor and the reference member is switched between a first positional relationship and a second positional relationship, wherein the reading sensor reads the image on the sheet passing the reading position in the first positional relationship, and wherein the reading sensor reads the reference member in the second positional relationship.

15. The image forming system according to claim 14, wherein the positional relationship is switched between the first positional relationship and the second positional relationship by movement of the reading sensor.

16. The image forming system according to claim 14, wherein the reference member is disposed on a side with the reading sensor with respect to the reading position.

17. The image forming system according to claim 14, wherein the reference member is disposed on a side opposite to the reading sensor with respect to the reading position.

18. The image forming system according to claim 17, wherein the reference member is configured to be switched between a first orientation and a second orientation, wherein in a case where the reading sensor reads the image on the sheet passing the reading position, the reference member is controlled to be in the first orientation, and wherein in a case where the reading sensor reads the reference member, the reference member is controlled to be in the second orientation.

19. The image forming system according to claim 10, wherein the controller determines a timing of the reading sensor reading the reference member, based on an elapsed time during the inspection processing.

20. The image forming system according to claim 10, wherein in print processing where the inspection processing is not performed and both an image and a test image are formed on each of another plurality of sheets, the controller controls conveyance of the another plurality of sheets to cause each of the another plurality of sheets to reach the reading position at the predetermined time interval, wherein a reading result of the test image read by the reading sensor is used to adjust density of an image to be formed by the image forming apparatus, wherein even in a case where the reading sensor reads the reference member during the print processing, the controller controls conveyance of the another plurality of sheets to cause each of the another plurality of sheets to reach the reading position at the predetermined time interval, and wherein the controller controls the reading sensor to read the reference member in a passage of at least one sheet included in the another plurality of sheets at the reading position.

* * * * *